United States Patent [19]

Ginsberg

[11] 3,865,069
[45] Feb. 11, 1975

[54] LIQUID LEVEL INDICATING SYSTEM
[75] Inventor: Guenter Ginsberg, Miami, Fla.
[73] Assignee: Coulter Electronic, Inc., Hialeah, Fla.
[22] Filed: Apr. 9, 1973
[21] Appl. No.: 349,270

[52] U.S. Cl............... 116/4, 116/109, 116/118
[51] Int. Cl....................G08b 7/04, G01f 23/16
[58] Field of Search........... 73/290 R, 302; 116/109, 116/118 R, 65, 151; 137/558, 804, 842

[56] References Cited
UNITED STATES PATENTS

| | | | |
|---|---|---|---|
| 1,929,019 | 10/1933 | Ehn | 116/151 |
| 3,428,068 | 2/1969 | Howie | 137/842 |
| 3,643,620 | 2/1972 | Penny | 116/65 |
| 3,680,579 | 8/1972 | Hisada | 73/302 |
| 3,777,698 | 12/1973 | Hunter | 137/558 |

Primary Examiner—S. Clement Swisher
Attorney, Agent, or Firm—Silverman & Cass, Ltd.

[57] ABSTRACT

The fluidic liquid level indicating system is operable to provide an audible alarm such as a tapping or buzzer sound to indicate when liquid in a vessel has descended to a certain level above the bottom of the vessel. This result is obtained by having a fluid line opening into the vessel at a predetermined point above the bottom thereof and by having a specified gas pressure in the fluid line which is sufficient at a certain head pressure of liquid above the open end of the fluid line to allow bubbles of gas to escape from the fluid line through the liquid in the vessel. The escape of bubbles causes pressure changes in the fluid line and these pressure changes are utilized via a turbulence amplifier and a pilot operated fluid switch to cause intermittent operation of a piston and cylinder device which drives a striker against a stop.

8 Claims, 1 Drawing Figure

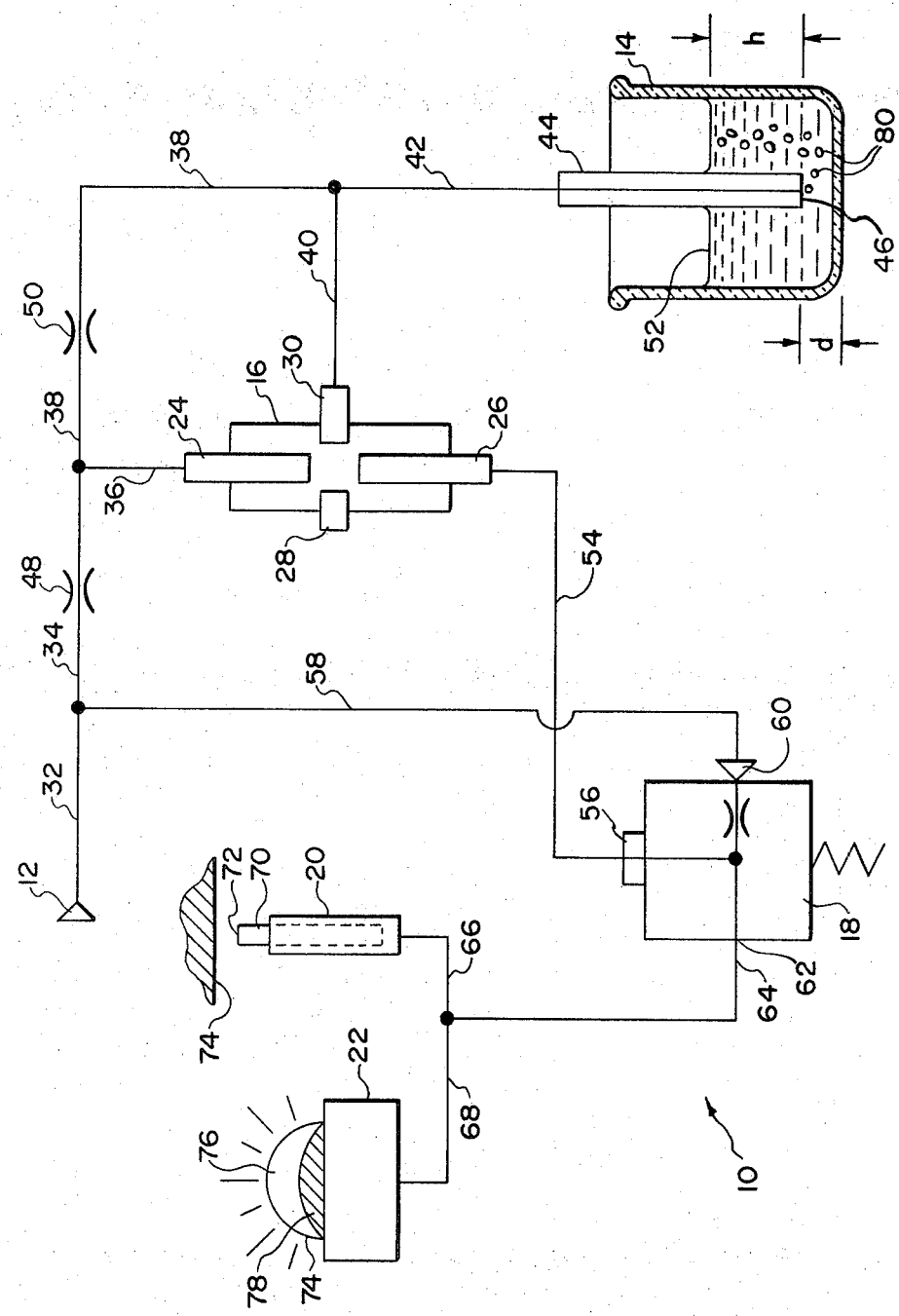

LIQUID LEVEL INDICATING SYSTEM

BACKGROUND AND SUMMARY OF THE INVENTION

The invention relates to a system for indicating when liquid in a vessel is approaching a certain lower level in the vessel and when the liquid has descended to that level in the vessel indicating that the vessel must be refilled. The system provides an audible alarm such as a tapping sound or buzzer sound and is completely fluidic. That is to say, the system operates solely from a fluid pressure source and does not use any other source of energy such as electricity.

Heretofore, liquid level indicating systems of many different types have been proposed. Many of these previously proposed systems utilize electricity to cause a buzzer or alarm to ring to indicate when liquid in a vessel has descended below a certain point in the vessel.

The liquid level indicating system to be disclosed hereinafter differs from the previously proposed systems in that it provides an audible alarm, namely a tapping or buzzing sound, utilizing only fluid pressure to cause the tapping or buzzing sound.

According to the invention there is provided a fluidic liquid level indicating system with audible alarm operable from a given fluid pressure source, the system including a fluid line which has an open end in a vessel containing a liquid and at a point spaced a predetermined distance above the bottom of the vessel, a cylinder, a striker connected to the piston of the cylinder, a stop juxtaposed to the striker, and means connected between the cylinder, the fluid pressure supply and the fluid line for causing the striker intermittenly to strike the stop when the level of liquid in the vessel descends to a predetermined height above the open end of the fluid line and bubbles of fluid escape from said open end through the liquid.

BRIEF DESCRIPTION OF THE DRAWING

The drawing illustrates a schematic diagram of the fluidic liquid level indicating system.

DESCRIPTION OF A PREFERRED EMBODIMENT OF THE INVENTION

In the drawing is illustrated schematically a liquid level indicating system 10. The system 10 operates from a source 12 of pressurized fluid, namely a pressurized gas such as air. The system is operable to indicate when liquid in a vessel 14 has descended to a predetermined lower level in the vessel and then to indicate when the vessel is substantially empty of liquid.

The system 10 includes a turbulence amplifier 16, a pilot operated pressure switch 18, a piston and cylinder device 20 and a pressure operated indicator 22 which presents different colors to an observer dependent upon the pressure supplied thereto.

The turbulence amplifier 16 includes an input 24, an output 26, a vent 28 and a control 30. Pressurized fluid is supplied to the input 24 of the amplifier 16 from the source 12 via fluid lines 32, 34 and 36. Another fluid line 38 extends from the junction between the lines 34 and 36 to a line 40 leading to the control 30. At the junction between the fluid lines 38 and 40 is a fluid line 42 which extends through a standpipe 44 into the vessel 14. The lower end 46 of fluid line 42 is open and is located at a predetermined distance $d$ above the bottom of the vessel 14.

As shown, a fluid resistance or choke 48 is situated in the line 34 and a similar type of fluid resistance or choke 50 is situated in the line 38. The chokes 48 and 50 are chosen to attenuate the fluid flow from the supply source 12 in such a manner that when the level of the liquid in the vessel 14 descends to a level 52 which is at a predetermined head pressure or height $h$ above the open end 46 of the line 42, bubbles of gas, such as air from the supply 12 will bubble out of the open end 46 through the liquid. As each bubble escapes from the fluid line 42 the pressure in the line 40 connected to the control 30 decreases suddenly. This decrease in pressure allows fluid pressure supplied to the input of the amplifier 24 via the line 36 to be transmitted to the outlet 26 and from there via a fluid line 54 to a control port 56 of the pilot operated switch 18 to open a passageway through the switch 18 whereby pressurized fluid can be transmitted to the device 22. As shown, the fluid is supplied from the source 12 via the fluid line 32 and a fluid line 58 to an input port 60 of the switch 18. It will be understood that when fluid pressure is supplied via the line 54 from the amplifier 16 to the control port 56 of the switch 18 fluid pressure supplied to the input 60 is transmitted to the output 62 and from there fed to the devices 20 and 22 via fluid lines 64, 66 and 68.

The piston and cylinder device 20 includes a piston 70 having a striker 72 at the outer end thereof; a stop 74 is positioned adjacent the striker 72.

The device 22 includes a partially spherical member 74 which is rotatably supported and which will rotate about an axis when pressure is supplied to the device 22. The partially spherical member 74 has a portion 76 thereof which is colored green and a portion 78 thereof which is colored red.

In operation when liquid in the vessel 14 reaches the level 52 and bubbles 80 start to bubble out from the lower open end 46 of the fluid line 42 pressure is intermittently and momentarily lost on the line 40 leading to the control 30. As a result, bursts of pressure are transmitted from the turbulence amplifier 16 to the fluid switch 18. These bursts of pressure cause intermittent operation of the fluid switch 18 which transmits bursts of the full supply pressure from the input port 60 to the output port 62 and then to the devices 20 and 22. A burst of pressure supplied to the device 20 causes the strike 72 to hit the stop 74 thereby making a tapping sound. The bubbles tend to flow out of the open end 46 more rapidly as the level of liquid descends in the vessel 14 and subsequent more rapid bursts of pressure are supplied to the device 20 causing more tapping. This tapping or simulated buzzer sound will alert an operator utilizing liquid from the vessel 14 that it is almost out of liquid. Of course, when the level of the liquid in the vessel 14 descends below the open end 46 of the fluid line 42 all pressure is lost in the control line 40 such that the switch 18 is fully open and the full fluid supply pressure is supplied to the tapping device 20 and the indicating device 22. In this respect only the red portion 78 of the spherical member 74 now will be displayed to an observer indicating that the vessel 14 is essentially completely out of liquid.

In one working system the supply pressure is 5 psi and the head pressure or critical height $h$ is one-half inch.

The system can be utilized in many environments where it is desired to monitor the level of liquid in a vessel as the liquid is being withdrawn from the vessel. In this regard the system is particularly useful with an apparatus for making colorimetric tests and in which fluid pressure is utilized for cleaning out the fluid lines of the apparatus.

What it is desired to secure by Letters Patent of the United States is:

1. A fluidic liquid level indicating system with an audible alarm, said system being operable from a fluid pressure source and including a fluidic amplifier having an input, a control and an output, a first fluid line between the fluid pressure source and said input, first means for establishing a fluid resistance in said first fluid line to attenuate fluid flow from the fluid pressure source, a second fluid line from said input to the interior of a vessel containing a supply of liquid, said second fluid line having an end opening into the vessel at a predetermined distance above the bottom of the vessel, second means for establishing a fluid resistance in said second fluid line to attenuate fluid flow through said second fluid line, a third fluid line between said control and said second fluid line and connected to said second fluid line at a point between said second means for establishing a fluid resistance and said open end in the vessel, a pilot operated fluid switch having a pilot connection to the output of said amplifier, said switch being connected between the fluid pressure source and a fluid operated piston and cylinder device having a piston with a striker at the end thereof, a stop adjacent said striker, said fluid resistances being such that when the liquid is at a predetermined height above the open end of said second fluid line, bubbles of fluid escape from said open end causing intermittent output signals at said output of said amplifier which intermittently operate said switch to intermittently apply pressure to said piston and cylinder device to cause intermittent striking of said striker against said stop which indicates that the level of liquid is close to the bottom of the vessel.

2. The fluidic liquid level indicating system according to claim 1 wherein said output of said pilot operated fluid switch is also connected to a pressure operated indicator which will present a different color to an observer when there is a change from zero gauge pressure to some positive gauge pressure applied thereto, and which will present a color indicating that the liquid level in the vessel is below said open end of said second fluid line when fluid is allowed to escape freely from said open end thereby relieving pressure from said control of said fluidic amplifier so that said pilot operated switch supplies fluid pressure to said indicator.

3. A fluidic liquid level indicating system with audible alarm operable from a fluid pressure source, said system including a fluid line which extends into a vessel containing a liquid and has an open end at a predetermined distance above the bottom of the vessel, a piston and cylinder device, a striker connected to said device, a stop juxtaposed to said striker, and fluidic control means connected between the fluid pressure source, said fluid line and said device for causing said striker intermittently to strike said stop when the level of liquid in the vessel descends to a predetermined height above said open end of said fluid line and bubbles of fluid escape from said open end through the liquid.

4. The fluidic liquid level indicating system according to claim 3 including an indicator for presenting different colors to an observer depending upon the pressure applied thereto, said indicator being connected to said fluidic control means in parallel with said piston and cylinder device and being operable after liquid in the vessel has descended below said open end of said fluid line to present a different color to an observer indicating that the vessel is substantially empty of liquid.

5. The system according to claim 3 wherein said fluidic control means includes a fluidic amplifier having an output connected to said piston and cylinder device, an input connected to the fluid pressure source and a control connected to said fluid line, said fluid line also being connected to said amplifier input.

6. The system according to claim 5 wherein said fluidic control means includes means for establishing a fluid resistance in the connection between the fluid pressure source and said amplifier input.

7. The system according to claim 5 wherein said fluidic control means includes means for establishing a fluid resistance in said fluid line between said amplifier input and the connection of said fluid line to said control.

8. The system according to claim 5 wherein said fluidic control means includes a pilot operated fluid switch situated in said connection between said amplifier output and said piston and cylinder device, said switch being connected to the fluid pressure source and operable upon receiving a fluidic signal from said amplifier to supply fluid pressure from the fluid pressure source to said piston and cylinder device.

* * * * *